(12) United States Patent
Vandike et al.

(10) Patent No.: US 10,820,505 B2
(45) Date of Patent: Nov. 3, 2020

(54) SELF-LEARNING GRAIN SENSING SYSTEM

(71) Applicant: Deere & Company, Moline, IL (US)

(72) Inventors: Nathan R. Vandike, Geneseo, IL (US); Bradley K. Yanke, Eldridge, IA (US); Volker Fuchs, Bettendorf, IA (US)

(73) Assignee: Deere & Company, Moline, IL (US)

( * ) Notice: Subject to any disclaimer, the term of this patent is extended or adjusted under 35 U.S.C. 154(b) by 317 days.

(21) Appl. No.: 16/127,272

(22) Filed: Sep. 11, 2018

(65) Prior Publication Data

US 2020/0077583 A1 Mar. 12, 2020

(51) Int. Cl.
*A01D 41/127* (2006.01)
*G06N 20/00* (2019.01)
*G01F 1/30* (2006.01)

(52) U.S. Cl.
CPC .......... *A01D 41/1272* (2013.01); *G01F 1/30* (2013.01); *G06N 20/00* (2019.01)

(58) Field of Classification Search
CPC ............ A01D 41/1271; A01D 41/1272; A01D 41/1273; A01F 12/44; A01F 12/442; A01F 12/444; A01F 12/446; A01F 12/448; A01F 12/46; G06N 20/00; G01F 1/30; G01F 1/66; G01F 1/76; G01D 3/02
USPC .......... 56/10.2 R, 10.2 B–10.2 E; 73/861.73; 460/1, 4, 5, 7; 701/50; 702/86, 104
See application file for complete search history.

(56) References Cited

U.S. PATENT DOCUMENTS

| | | | |
|---|---|---|---|
| 5,015,997 A | | 5/1991 | Strubbe |
| 5,369,603 A | * | 11/1994 | Myers ...................... G01D 3/02 702/104 |
| 5,837,906 A | * | 11/1998 | Palmer ................ A01D 41/1271 73/861.73 |
| 6,119,442 A | * | 9/2000 | Hale ................... A01D 41/1277 56/10.2 H |
| 6,591,145 B1 | * | 7/2003 | Hoskinson ........... A01D 41/127 460/1 |
| 7,029,444 B2 | * | 4/2006 | Shin .................... A61B 5/14532 600/365 |
| 9,127,972 B2 | * | 9/2015 | Dankowicz ............... G01F 1/76 |

(Continued)

FOREIGN PATENT DOCUMENTS

EP 1832863 A2 9/2007
JP 2015204806 A 11/2015

(Continued)

OTHER PUBLICATIONS

European Search Report issued in counterpart European Patent Application No. 19192814.2 dated Mar. 25, 2020 (9 pages).

*Primary Examiner* — Robert E Pezzuto

(57) ABSTRACT

A self-learning grain sensing system for an agricultural harvester includes a first grain sensor having a first sensing surface responsive to first impacts of grain upon the first sensing surface, wherein the first grain sensor generates first electrical pulses in response to the first impacts; a second grain sensor having a second sensing surface responsive to second impacts of grain upon the second sensing surface, and wherein the second grain sensor generates second electrical pulses in response to the second impacts; and a control system configured to receive the first electrical pulses from the first grain sensor, derive control parameters from the first electrical pulses, and apply those control parameters to the second electrical pulses.

21 Claims, 3 Drawing Sheets

(56) References Cited

U.S. PATENT DOCUMENTS

| | | | |
|---|---|---|---|
| 9,578,808 B2* | 2/2017 | Dybro | A01D 45/021 |
| 9,702,753 B2* | 7/2017 | Johnson | G01F 25/0046 |
| 2013/0080079 A1 | 3/2013 | Dankowicz et al. | |
| 2017/0071125 A1 | 3/2017 | Pfeiffer et al. | |

FOREIGN PATENT DOCUMENTS

| | | |
|---|---|---|
| WO | 2014030511 A1 | 2/2014 |
| WO | 2016058890 A1 | 4/2016 |

* cited by examiner

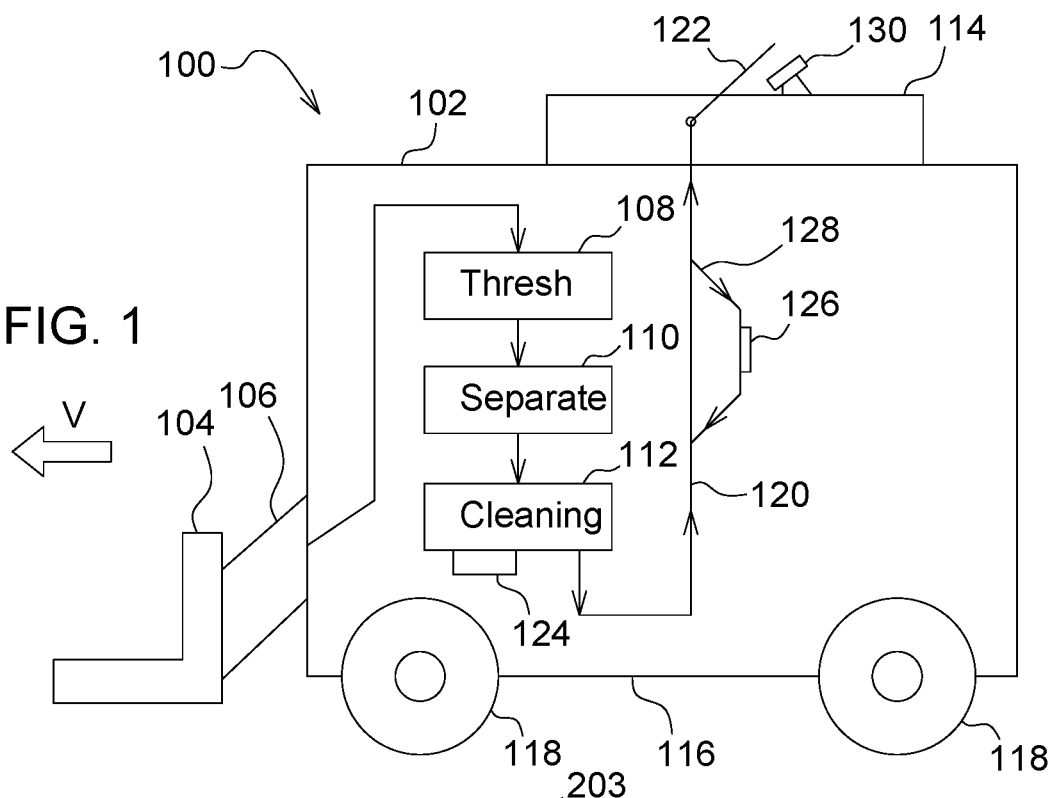
FIG. 1
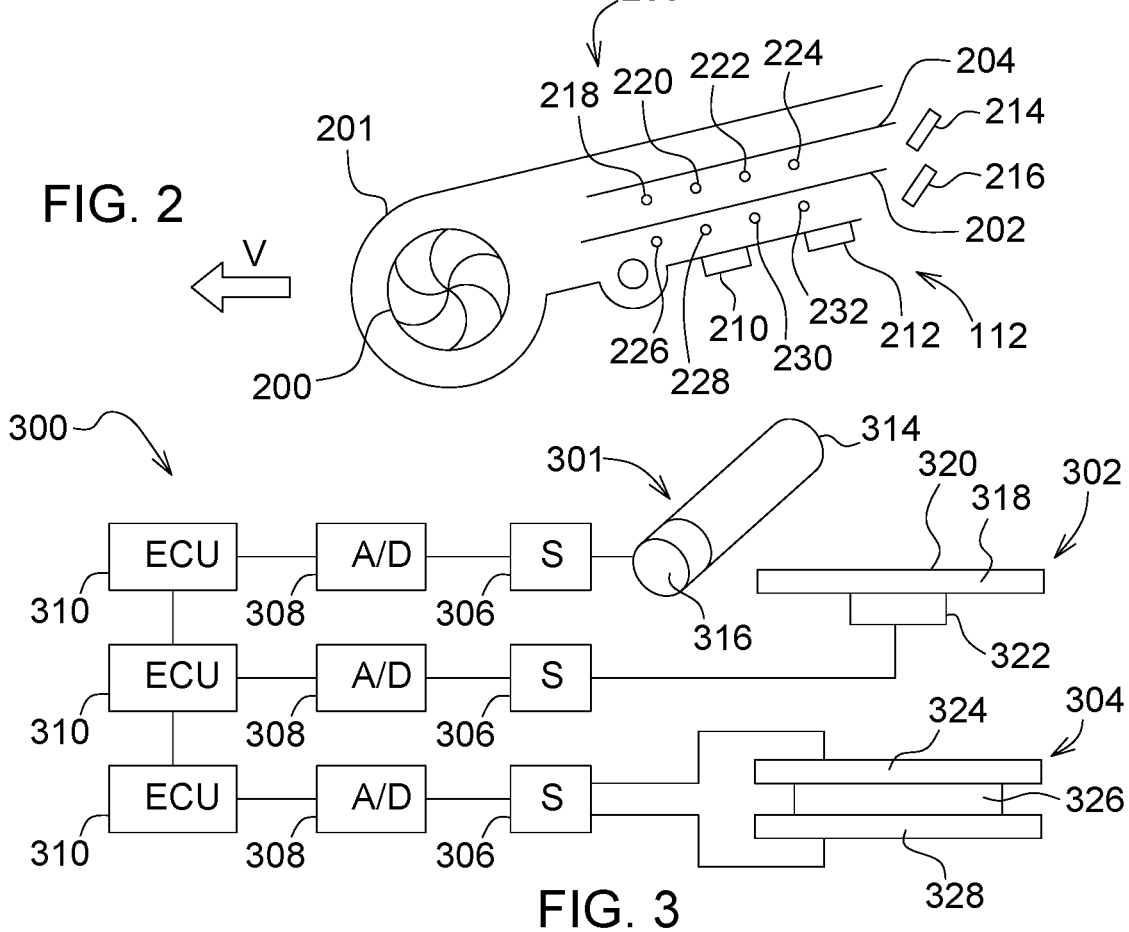
FIG. 2
FIG. 3

US 10,820,505 B2

SELF-LEARNING GRAIN SENSING SYSTEM

RELATED APPLICATIONS

There are no related applications.

FIELD OF THE INVENTION

This invention relates to agricultural harvesters. More particularly, it relates to grain sensing systems for agricultural harvesters. Even more particularly, it relates to arrangements for training grain sensors.

BACKGROUND OF THE INVENTION

Agricultural harvesters are designed to travel through agricultural fields and harvest grain. In order to monitor the operation of the various components of the agricultural harvester, sensors are mounted in locations where they can sense the passage of grain to determine characteristics of the grain, such as quantity, location, and physical characteristics of the grain (size, moisture content, and the like).

Signals generated by grain sensors are processed in order (1) to distinguish between grain and material other than grain, (2) to determine characteristics of the grain. This processing is done by programmable controllers that compare the grain sensor signals with reference values specific to particular crop types and grain characteristics.

Unfortunately, grain characteristics (e.g. size, shape, volume, mass, moisture content, etc.) change from crop to crop, field to field, and even from location to location within the field. Further, the kernels of grain in mixed grain flows are obscured by clutter from material other than grain.

The more the grain characteristics change, and the more the kernels are mixed in with clutter from other material, the grain sensors' accuracy drops.

What is beneficial, therefore, is a system for adjusting or "tuning" the operation of the circuitry that processes the grain signals to accommodate these changes. What is also beneficial is to use signals from a first grain sensor to adjust the operation of a second sensor.

It is an object of this invention to provide such grain sensing system.

SUMMARY OF THE INVENTION

In accordance with a first aspect of the invention, a self-learning grain sensing system for an agricultural harvester is provided, the harvester being configured for self-propelled travel through an agricultural field to harvest grain, the system comprising a first grain sensor having a first sensing surface responsive to first impacts of grain upon the first sensing surface, wherein the first grain sensor generates first electrical pulses in response to the first impacts; a second grain sensor having a second sensing surface responsive to second impacts of grain upon the second sensing surface, and wherein the second grain sensor generates second electrical pulses in response to the second impacts; and a control system configured to receive the first electrical pulses from the first grain sensor, derive control parameters from the first electrical pulses, and apply those control parameters to the second electrical pulses.

The control system may be configured to receive the first electrical pulses, to derive control parameters, and to apply the control parameters to the second electrical pulses while the agricultural harvester is traveling through the agricultural field.

The first grain sensor and the second grain sensor may comprise a piezoelectric sensing element.

The derived control parameters may vary with a pulse amplitude of the first electrical pulses.

The derived control parameters may vary with a slope of the first electrical pulses.

The derived control parameters may indicate changes in physical characteristics of kernels of grain impacting the first grain sensor.

The physical characteristics may include the volume of the kernel or the mass of the kernel or both.

The derived control parameters may define a first threshold that indicates a difference between a kernel of grain and material other than grain.

The derived control parameters may define a second threshold different from the first threshold.

The agricultural harvester may comprise a grain reservoir disposed to collect grain that has been threshed, separates and cleaned by the agricultural harvester, wherein the first grain sensor is disposed in a flow of grain at a location after the grain has been threshed, separated and cleaned and before the grain has been deposited in the grain reservoir.

The second grain sensor may be disposed in a flow of grain at a location before the grain has been cleaned and after the grain has been threshed.

The first grain sensor may be disposed in a flow of clean grain, and the second grain sensor may be disposed in a flow of dirty grain.

The first grain sensor may be disposed in a cleaning shoe of the agricultural combine.

The first grain sensor may be disposed in a flow of clean grain and the second grain sensor may be disposed in a flow of dirty grain.

The first grain sensor may be disposed in a clean grain elevator bypass or at the exit of a clean grain elevator.

The second grain sensor may be disposed underneath a sieve or a chaffer to sense grain falling through the sieve or chaffer.

The second grain sensor may be disposed at the rear of a sieve or a chaffer to sense grain falling off the rear of the sieve or chaffer.

The first sensor or the second sensor may be a plate sensor.

The first sensor or the second sensor may be a rod sensor.

The control system may be configured to repeatedly receive the first electrical pulses from the first grain sensor, derive control parameters from the first electrical pulses, and apply those control parameters to the second electrical pulses during a single harvesting session to thereby tune the second grain sensor multiple times during a single harvesting session.

In accordance with a second aspect of the invention, a self-tuning sensor system for an agricultural combine is provided, comprising: a first grain sensor; a second grain sensor; and a controller coupled to the first grain sensor and the second grain sensor that is configured to automatically tune the second grain sensor based upon sensor signals received from the first grain sensor.

BRIEF DESCRIPTION OF THE DRAWINGS

FIG. 1 is a side schematic view of an agricultural harvester in accordance with the present invention.

FIG. 2 is a side schematic view of a cleaning mechanism (shown as a cleaning shoe) of the agricultural harvester of FIG. 1.

FIG. 3 is a circuit schematic of three grain sensor arrangements in the agricultural harvester of FIGS. 1 and 2.

DETAILED DESCRIPTION OF THE PREFERRED EMBODIMENTS

Figure 4:
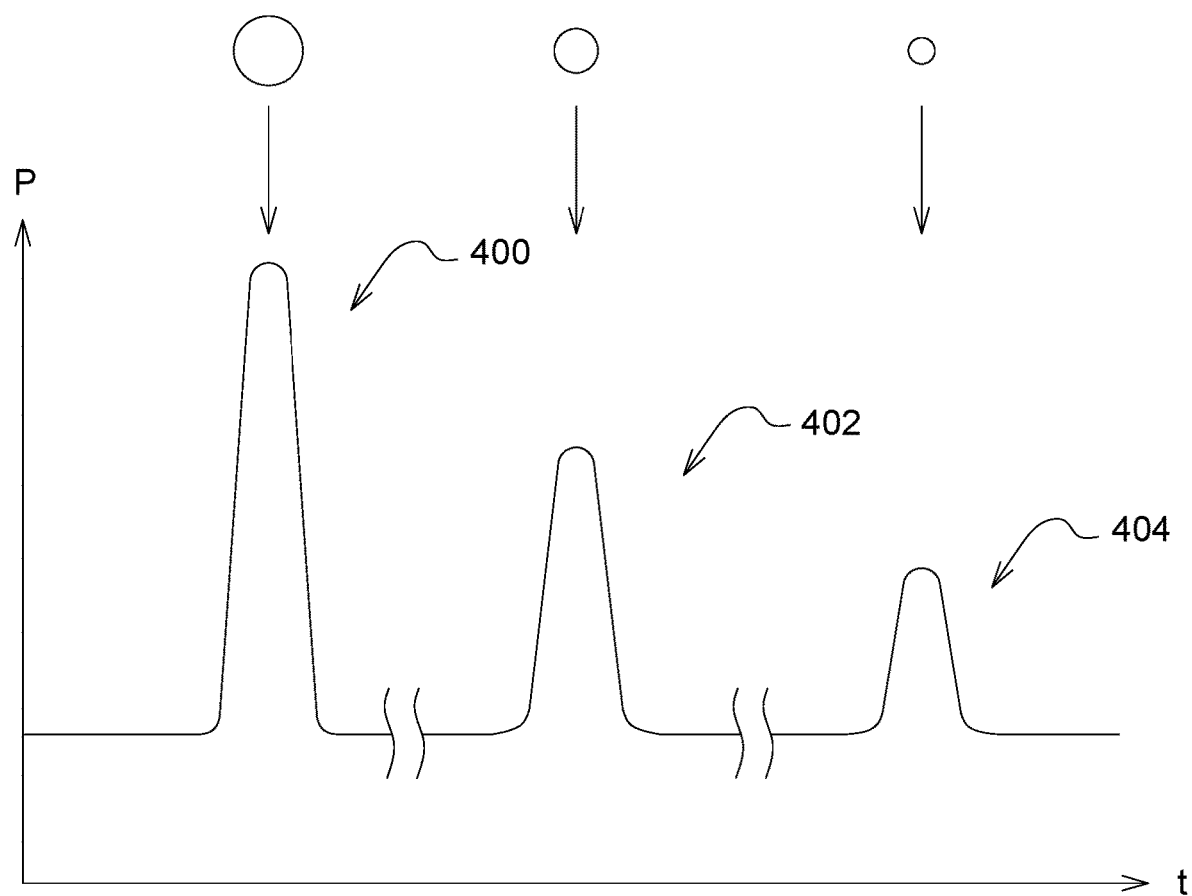
FIG. 4 is a graph of typical grain sensor signals provided by grain kernels of three different sizes. Each of the signals varies from the others in peak amplitude and slope.

An agricultural harvester 100 comprises a self-propelled vehicle 102 and a harvesting implement 104 mounted on the front of the vehicle 102. The implement 104 is supported on a feederhouse 106 that extends forward from the front of the vehicle 102.

The vehicle 102 comprises a threshing mechanism 108, a separating mechanism 110, a cleaning mechanism 112 and a storage tank 114 for storing cleaned grain.

The components of the vehicle 102 are supported on a chassis 116, which in turn is supported on wheels or tracks 118 which carry the vehicle 102 for travel through the field harvesting crops.

Crops growing in the agricultural field being harvested by the agricultural harvester 100 are severed from the ground by a reciprocating knife that extends across the front of the harvesting implement 104. The cut crop material falls rearward onto a lateral conveyor which conveys the crops inwardly to a central region of the harvesting implement 104. The cut crop material is then carried rearward through an aperture in the frame of the harvesting implement 104, and into the feederhouse 106 which has an internal conveyor. The cut crop material exits the feederhouse 106 and is conveyed into the inlet of the threshing mechanism 108, where the cut crop material is threshed, thereby breaking the grain loose from the remainder of the crop plant. The cut crop material passes through the threshing mechanism 108 and the threshed grain is then conveyed to the separating mechanism 110, which separates the now-loose grain from the remainder of the crop plant. The now-separated loose grain falls downward into the cleaning mechanism 112. Once the cleaning mechanism 112 has cleaned the loose grain, the clean grain falls to the bottom of the cleaning mechanism and is carried upward to the grain tank 114 by a clean grain elevator 120. The clean grain exits the upper end of the clean grain elevator 120 and is conveyed to a fountain auger 122. The fountain auger releases the grain into the grain tank 114.

Grain sensors are located at various places on the agricultural harvester 100. One grain sensor 124 is fixed at the floor of the cleaning mechanism 112 to sense the grain passing through the cleaning mechanism 112. Another grain sensor 126 is fixed to a grain bypass circuit 128. The grain bypass circuit 128 is coupled to the clean grain elevator 120 and directs a portion of the clean grain in the clean grain elevator 120 to be sensed by the grain sensor 126. A third grain sensor 130 is mounted at the outlet of the fountain auger 122.

FIG. 2 illustrates one arrangement of the cleaning mechanism 112, which is commonly called a "cleaning shoe". In this arrangement, a cleaning fan 200 disposed in a housing 201 generates a flow of air that passes upward through one or more sieves or chaffers 202, 204. In this arrangement, dirty grain 203 falls from the threshing mechanism 108 and/or the separating mechanism 110 downward onto the sieves and/or chaffers. Airflow generated by the cleaning fan passes rearward, upward, and through the sieves and/or chaffers. This airflow lifts light portions of the crop residue and carries them rearward to a residue exit. Clean grain, however, passes downward through holes in the sieves and/or chaffers and falls onto the floor 208 of the cleaning mechanism 112.

Several grain sensors 210-232 are mounted to the cleaning mechanism 112 to detect the passage of grain and/or grain mixed with residue through the cleaning mechanism 112. These sensors are preferably acoustic (e.g. sound, vibration or impact) sensors. They sense the presence of grain by generating signals caused by the contact of grain and/or grain mixed with residue on the sensing elements. When grain and/or grain mixed with residue impacts the sensors, they generate electrical pulses that indicate these impacts. Signal processing circuitry connected to the sensing elements receive signals from these elements and determines characteristics of the material, such as when and where a grain kernel impacted the sensing element, what the mass of the grain kernel is, how many grain kernel impacts have occurred, what the mass flow rate of grain is and the like.

Grain sensors 210, 212 are mounted adjacent the floor of the cleaning mechanism and sense the presence of grain and other matter falling on the floor and generate a signal indicative of this material.

Grain sensors 214, 216 are mounted adjacent the exit of the sieves and chaffers 202, 204 and sense the presence of grain and other matter exiting the sieves and chaffers and generate a signal indicative of this material.

Grain sensors 218, 220, 222, 224 are mounted underneath a first one of the sieve and chaffer 210 in a spaced apart relationship in the direction of flow such that they are impacted by grain falling through the first one. This arrangement along the length of the first one permits the system to determine where along the length of the first one that grain is falling through and to responsively adjust the angular settings of the slats of the first one and the speed of the fan 200 to prevent grain from being blown to the right end and out of the combine.

Grain sensors 226, 228, 230, 232 are mounted underneath a second one of the sieve and chaffer 210 in a spaced-apart relationship in the direction of flow such that they are impacted by grain falling through the second one. This arrangement along the length of the second one permits the system to determine where along the length of the second one that grain is falling through and to responsively adjust the angular settings of the slats of the second one and the speed of the fan 200 to prevent grain from being blown to the right end and out of the combine.

To determine whether a grain kernel has impacted the sensing elements, an ECU coupled to the sensing element must analyze the raw signal received from the sensing element. This may be done in a variety of ways. For example, the raw signal can be filtered such that any fluctuation (i.e. grain kernel pulse) with an amplitude below a predetermined level is rejected. This can be done using analog circuitry. Alternatively, the raw signal can be provided directly to an analog to digital converter and this processing/filtering can be done by software on the digitized signal.

The pulse magnitude and the pulse width generated by the sensing element is a function of the kinetic energy of each grain kernel, which in turn is a function of the mass of the grain kernel. Thus, the larger the pulse generated by the sensing element, the greater the mass of the grain kernel.

Grain kernels, however, can vary dramatically (e.g. in mass, weight, volume, density, moisture content) and thus signals generated by the grain sensors in response to grain kernel impacts can also vary dramatically. Kernels of corn have a much larger mass than kernels of canola. Furthermore, different varieties of plants also vary in volume and mass. Thus, a kernel from one variety of corn (e.g. field corn) may have different characteristics than the kernel of another variety of corn (e.g. popcorn). Further, the moisture content of individual grain kernels (even of the same variety) can vary. Thus, a moist grain kernel can have a greater mass than a dry grain kernel of the same variety.

Even further, grain kernels of the same variety can vary (e.g. in mass, weight, volume, density, moisture content) depending upon the place they are harvested in a field.

Because of this variation in grain kernels themselves, it is difficult to configure grain sensors to accurately sense and indicate the grain kernels striking the surface of the grain sensor. The amplitude and duration of individual grain kernel pulses generated by grain sensors changes from plant to plant, from variety to variety, and from location to location in the field.

The sensing problem due to changing grain characteristics is compounded by the quality of the raw material falling on the grain sensors. For example, grain sensors may be disposed in a flow of material that includes not just grain, but some residue as well. This residue has different physical characteristics (e.g. hard or soft, large or small, high density or low density) than the grain with which it is entrained.

To improve the performance of grain sensors, the current system measures signals generated by grain being harvested with a first sensor, determines changes in these measured signals indicating changes in grain characteristics of the grain being harvested, and then adjusts filter parameters of a second grain sensor based upon the changes in grain characteristics provided by the first sensor. In this manner, the system can automatically and dynamically tune the response of the second sensor.

In FIG. 3, a grain sensing system 300 including three exemplary grain sensors 301, 302, 304 are illustrated. The grain sensors are connected to signal conditioning circuits 306, analog-to-digital conversion circuits 308, and ECUs 310. The grain sensors are coupled to a network 312, which may further include other ECUs and grain sensors.

Sensor 301 is an acoustic sensor having elongate elements 314 (shown here as rods) connected to a sensing element 316. The sensors may be disposed as sensors 218, 220, 222, 224, 226, 228, 230, and 232 to sense the impacts of grain against the rod 314 in between and underneath the sieves and chaffers 202, 204. Grain impacts the rods, and the sensing element 316 generates corresponding pulses which are provided to the signal conditioning circuit 306.

Sensor 302 is an acoustic sensor having a generally planar impact plate 318 with an exposed surface 320 against which grain impacts, and a sensing element 322 (typically a piezoelectric element) fixed to the back of the impact plate 318. As grain impacts the exposed surface 320, the plate 318 flexes and communicates this flexure to the element 322 which is bonded thereto. Each flexure of the element 322 thereby generates a corresponding pulse from element 322 which is provided to the signal conditioning circuit 306.

Sensor 304 is an acoustic sensor having a generally planar outer conductive layer 324, a compressible sensing layer 326, and a base conductive layer 328 sandwiching the sensing layer 326. Grain impacting the outer conductive layer 324 causes local compression of the sensing layer 326. The electrical characteristics of the sensing layer 326 change in response to this compression, and electrical pulses from grain impacts are communicated to the signal conditioning circuit 306 through electrical connections to the outer conductive layer 324 and the base conductive layer 328.

Any of the grain sensors 301, 302, 304 can be used anywhere in the agricultural harvester 100 to sense grain impacts. In the arrangement illustrated in FIG. 2, grain sensor 301 is preferably employed as grain sensors 218, 220, 222, 224, 226, 228, 230, and 232 above, below and/or between the sieves and chaffers.

In the arrangement illustrated in FIG. 2, grain sensors 302, 304 are preferably employed as grain sensors 124, 210, 212, 214, and 216 that the bottom of the cleaning mechanism 112 and adjacent to the rear of the sieves and chaffers.

The signal conditioning circuits 306 may include high-pass, low-pass, or bandpass filters to reduce noise in the signals provided to them by the grain sensors. The filter parameters may be fixed, or (more preferably) they may be dynamically adjustable under program control by their internal circuitry or by the ECUs 310 to which they are connected.

The analog-to-digital conversion circuits 308 receive the conditioned signals from the signal conditioning circuit 306 and convert them into digital form. The analog-to-digital conversion circuits 308 and provide the signals to the ECUs 310 for further processing, such as counting the number of pulses, determining whether the pulses correspond to a grain impact or not, calculating average grain flow rates or grain characteristics (e.g. grain size, mass, or other characteristics determinable by analysis of the pulses), generating bar graphs and numeric values indicating grain characteristics, grain flow rates, the proportions of grain versus residue, etc. that are subsequently provided on electronic visual displays 330 coupled to the network 312.

The signal conditioning circuits 306 and the analog-to-digital conversion circuits 308 may be formed integral with each other or with the ECUs 310. They may be digitally programmable to permit adjustment of signal conditioning parameters and analog-to-digital conversions. They may be FIG. 4 illustrates a variety of typical pulses that are produced by any of the grain sensors herein when a kernel of grain impacts the grain sensor. The pulses differ from each other based upon different physical characteristics of each kernel. The kernels with greater mass generate pulses with higher amplitude.

Pulse 400 is generated by a grain kernel having a large volume, cross-sectional area and high mass. The pulse 400 has high pulse peak, a steep angle of ascent (slope) and a greater area under the pulse.

Pulse 402 is generated by a grain kernel at a different location in the field, harvested at a later time during the continuous harvesting process and having smaller volume, smaller cross-sectional area, and a smaller mass than kernel 400. The pulse 402 has medium pulse peak, a shallower angle of ascent and a smaller area under the pulse.

Pulse 404 is generated by a grain kernel at a different location in the field, harvested at a later time during the continuous harvesting process and having a smaller volume, smaller cross-sectional area, and a smaller mass than kernel 402. The pulse 404 has a small pulse peak, an even shallower angle of ascent and an even smaller area under the pulse.

This illustrates that physical characteristics of kernels of grain are correlated with grain sensor signals, and both the kernel characteristics and the corresponding signals from the grain sensors change as a harvesting vehicle travels through a field harvesting grain.

Figure 5:
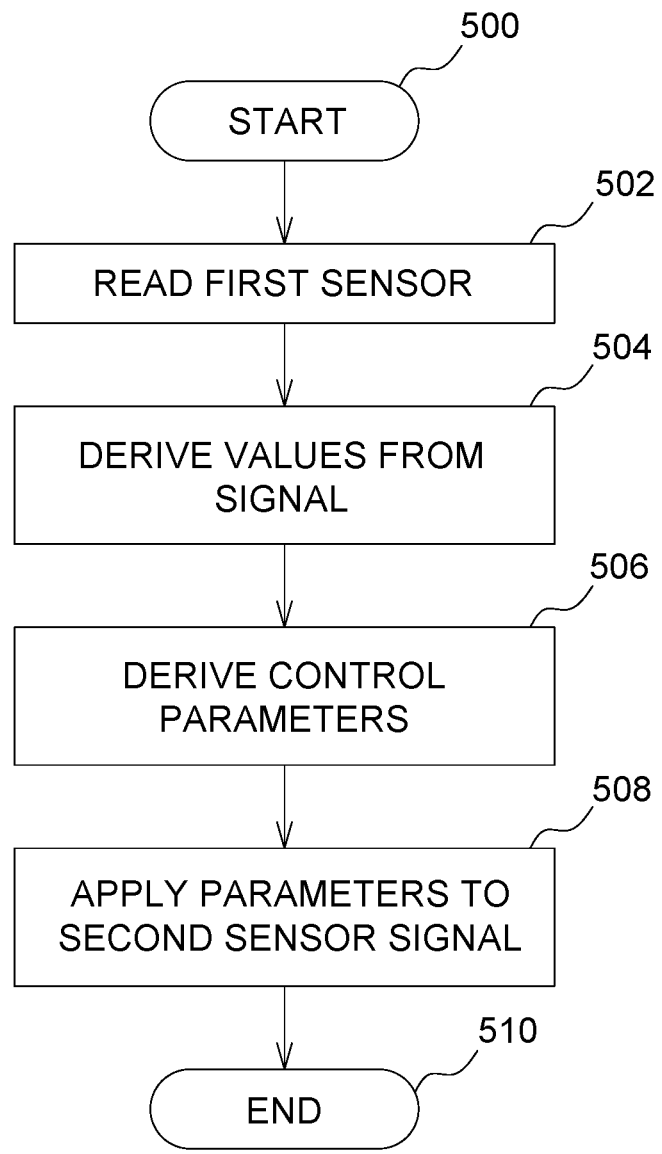
FIG. 5 is a flow chart of the operation of the grain sensing system.

FIG. 5 illustrates the programmed operation of the grain sensing system 300. The grain sensing system 300 500 includes the grain sensors, signal conditioning circuits, analog to digital conversion circuits and the ECUs discussed herein. The grain sensors, signal conditioning circuits, analog to digital conversion circuits and the ECUs may be digital or analog devices and may be individually or collectively programmable to produce the functions described herein.

In step 500 the process starts. Typically the agricultural harvester is traveling through the agricultural field harvesting crops at this time.

In step 502, the system reads the signal from a first sensor. The first sensor is preferably exposed to a flow of relatively clean grain that has just been harvested by the agricultural harvester. i.e. a flow of grain from which material other than grain (MOG) has already been substantially removed.

In step 504, the system derives values from the signal that indicate characteristics of a kernel (or kernels) of grain that generated the signal. In one arrangement, the values may represent the shape of a pulse (or part of the pulse, or of several pulses), such as the pulse peak, the slope of the pulse, the area under the pulse curve, the average of multiple pulses, the statistical variation of the shape of several pulses, etc.

In step 506, the system derives control parameters from the values. These parameters are used in a signal processing algorithm that processes signals from another grain sensor in order to characterize a pulse from the other grain sensor as a grain impact or an impact from some other type of material (e.g. pebbles, sticks, husks, culms, etc.).

As an example, as the combine travels through the field harvesting crop and grain characteristics change, the peak amplitude, or the slope, or the area under the pulse curve change (see FIG. 4 and discussion). The step 506 control parameters could be e.g. threshold values such as a maximum pulse amplitude, a minimum pulse amplitude or a range of pulse amplitudes, a maximum slope, a minimum slope, or a range of slopes or areas under the pulse curve. They could be filter parameters such as high pass, low pass or bandpass frequencies for filtering a grain sensor signal. They could be coefficients for a mathematical transform of the sensor signal.

In step 508, the system applies the derived control parameters to signals received from a second grain sensor. To apply the derived control parameters in one arrangement, the pulse signals received from the second sensor are evaluated according to the derived control parameters, and based upon this evaluation, the system characterizes the pulse as indicating a kernel of grain, or as indicating something else (e.g. MOG).

One way the pulse signal may be evaluated by the derived control parameters is by a simple comparison, for example, the peak amplitude of a pulse signal from the second sensor can be compared with the peak amplitude derived in step 506 from the first grain sensor signal. If they are the same, then the pulse signal from the second sensor is evaluated as a kernel of grain falling on the second grain sensor, otherwise it is evaluated as MOG.

Alternatively, the pulse signal may be evaluated by comparing the slope of the second sensor pulse signal with slope of the signal derived in step 506. If they are the same, then the pulse signal from the second sensor is evaluated as a kernel of grain falling on the second grain sensor, otherwise it is evaluated as MOG.

Alternatively, the pulse signal may be evaluated by comparing the area under the second sensor pulse signal with area under the first sensor pulse signal derived in step 506.

Alternatively, the second sensor signal can be evaluated by comparing it with any control parameter or combination of control parameters derived in step 506 from the first grain sensor signal.

In step 510 the programmed operation stops.

The process shown in FIG. 5 may be performed once to derive control parameters from the first grain sensor signal that are later applied to the second grain sensor signal.

Alternatively, steps 500-510 may be programmatically repeated periodically during a single harvesting session to compensate (for example) for physical parameters of grain that change in a field during that harvesting session (e.g. changes in size, mass, grain type, grain variety, and/or weight).

The system described and illustrated herein is a self-learning grain sensing system.

The system senses grain characteristics with a first grain sensor, derives values from signals generated by the first grain sensor, derives control parameters from those values, and applies those parameters to signals from a second grain sensor.

The system is thereby trained to provide more accurate determinations of grain characteristics, by learning from the response of a first grain sensor to known grain impacts and training a second grain sensor to thereby improve its ability to distinguish between grain impacts proper and impacts by material other than grain (MOG). The system can provide this training in real time (i.e. while the agricultural harvester is traveling through a field harvesting crop. It can make real time adjustments to a grain sensing algorithm as the properties of the grain change during harvesting and when these changes are detected at one grain sensor (the first grain sensor, discussed above), can apply them to one, or more, or all, of the other grain sensors on the agricultural combine.

In the examples illustrated herein, each grain sensor is provided with its own ECU. In another arrangement, multiple sensors can be coupled to a single ECU which is programmed to provide the same capabilities.

The claims below define the invention. The description and figures above are provided to enable one skilled in the art to make and use the invention. Other ways of making and using the invention will be apparent to those skilled in the art.

The invention claimed is:

1. A self-learning grain sensing system for an agricultural harvester, the harvester being configured for self-propelled travel through an agricultural field to harvest grain, the system comprising:
   a first grain sensor having a first sensing surface responsive to first impacts of grain upon the first sensing surface, wherein the first grain sensor generates first electrical pulses in response to the first impacts;
   a second grain sensor having a second sensing surface responsive to second impacts of grain upon the second sensing surface, and wherein the second grain sensor generates second electrical pulses in response to the second impacts; and
   a control system configured to receive the first electrical pulses from the first grain sensor, derive control parameters from the first electrical pulses, and apply those control parameters to the second electrical pulses.

2. The self-learning grain sensing system of claim 1, wherein the control system is configured to receive the first electrical pulses, to derive control parameters, and to apply the control parameters to the second electrical pulses while the agricultural harvester is traveling through the agricultural field.

3. The self-learning grain sensing system of claim 1, wherein the first grain sensor and the second grain sensor comprise a piezoelectric sensing element.

4. The self-learning grain sensing system of claim 1, wherein the derived control parameters vary with a pulse amplitude of the first electrical pulses.

5. The self-learning grain sensing system of claim 1, wherein the derived control parameters vary with a slope of the first electrical pulses.

6. The self-learning grain sensing system of claim 1, wherein the derived control parameters indicate changes in physical characteristics of kernels of grain impacting the first grain sensor.

7. The self-learning grain sensing system of claim 6, wherein the physical characteristics include the volume of the kernel or the mass of the kernel or both.

8. The self-learning grain sensing system of claim 1, wherein the derived control parameters define a first threshold that indicates a difference between a kernel of grain and material other than grain.

9. The self-learning grain sensing system of claim 8 wherein the derived control parameters define a second threshold different from the first threshold.

10. The self-learning grain sensing system of claim 1, wherein the agricultural harvester comprises a grain reservoir disposed to collect grain that has been threshed, separates and cleaned by the agricultural harvester, wherein the first grain sensor is disposed in a flow of grain at a location after the grain has been threshed, separated and cleaned and before the grain has been deposited in the grain reservoir.

11. The self-learning grain sensing system of claim 1, wherein the second grain sensor is disposed in a flow of grain at a location before the grain has been cleaned and after the grain has been threshed.

12. The self-learning grain sensing system of claim 1, wherein the first grain sensor is disposed in a flow of clean grain, and wherein the second grain sensor is disposed in a flow of dirty grain.

13. The self-learning grain sensing system of claim 11, wherein the first grain sensor is disposed in a cleaning shoe of the agricultural combine.

14. The self-learning grain sensor system of claim 1 wherein the first grain sensor is disposed in a flow of clean grain and the second grain sensor is disposed in a flow of dirty grain.

15. The self-learning grain sensor system of claim 14 wherein the first grain sensor is disposed in a clean grain elevator bypass or at the exit of a clean grain elevator.

16. The self-learning grain sensor system of claim 14 wherein the second grain sensor is disposed underneath a sieve or a chaffer to sense grain falling through the sieve or chaffer.

17. The self-learning grain sensor system of claim 14, wherein the second grain sensor system is disposed at the rear of a sieve or a chaffer to sense grain falling off the rear of the sieve or chaffer.

18. The self-learning grain sensor system of claim 14, wherein the first sensor or the second sensor is a plate sensor.

19. The self-learning grain sensor system of claim 18 wherein the first sensor or the second sensor is a rod sensor.

20. The self-learning grain sensor system of claim 1, wherein the control system is configured to repeatedly receive the first electrical pulses from the first grain sensor, derive control parameters from the first electrical pulses, and apply those control parameters to the second electrical pulses during a single harvesting session to thereby tune the second grain sensor multiple times during a single harvesting session.

21. A self-tuning sensor system for an agricultural combine, comprising:
 a first grain sensor;
 a second grain sensor; and
 a controller coupled to the first grain sensor and the second grain sensor that is configured to automatically tune the second grain sensor based upon sensor signals received from the first grain sensor.

* * * * *